(12) United States Patent
Ullrich

(10) Patent No.: US 12,043,173 B2
(45) Date of Patent: Jul. 23, 2024

(54) COURTESY HORN

(71) Applicant: Ross Ullrich, Manitou Springs, CO (US)

(72) Inventor: Ross Ullrich, Manitou Springs, CO (US)

( * ) Notice: Subject to any disclaimer, the term of this patent is extended or adjusted under 35 U.S.C. 154(b) by 65 days.

(21) Appl. No.: 17/806,585

(22) Filed: Jun. 13, 2022

(65) Prior Publication Data
US 2023/0398931 A1    Dec. 14, 2023

(51) Int. Cl.
*B60Q 5/00*    (2006.01)

(52) U.S. Cl.
CPC ............. *B60Q 5/00* (2013.01); *B60Q 5/003* (2013.01); *B60Q 5/008* (2013.01)

(58) Field of Classification Search
CPC .... B60Q 5/00; B60Q 5/008; B62J 3/00; B60J 6/16; A61B 5/00; A61B 5/087; G01H 1/00; G01H 1/0025; G01K 9/12; G01K 13/00
See application file for complete search history.

(56) References Cited

U.S. PATENT DOCUMENTS

| | | | |
|---|---|---|---|
| 2012/0182136 A1* | 7/2012 | Nakayama | B60Q 5/008 340/425.5 |
| 2014/0015654 A1* | 1/2014 | Nakayama | G10K 11/28 340/425.5 |
| 2014/0118128 A1* | 5/2014 | Orzeck | B62J 6/16 340/432 |
| 2021/0030308 A1* | 2/2021 | Grace | A61B 5/486 |

OTHER PUBLICATIONS

NPL Search (Nov. 8, 2023).*

* cited by examiner

*Primary Examiner* — Van T Trieu
(74) *Attorney, Agent, or Firm* — Dunlap Bennett & Ludwig, PLLC

(57) ABSTRACT

A courtesy horn for an automotive vehicle, wherein the courtesy horn is configured to enable to the driver to send an alternate, gentler horn sound, and wherein the courtesy horn is provided in addition to the standard automotive vehicular horn.

14 Claims, 3 Drawing Sheets

COURTESY HORN

BACKGROUND OF THE INVENTION

The present invention relates to automotive vehicles and, more particularly, a courtesy horn for an automotive vehicle, wherein the courtesy horn is configured to enable the driver to send an alternate, gentler horn sound, and wherein the courtesy horn is provided in addition to the standard automotive vehicular horn.

Every driver, sooner or later, hears a horn from another driver and is affronted by the accusation implied by said horn. Typically, this affronted feeling arises when the recipient of the horn does not feel their action (or inaction) warranted the rebuke signaled by the horn. In worst case examples, such situations can result in physical confrontations that are inherently dangerous. Even when hurt feelings do lead to conflict, these hurt feelings can diminish the overall enjoyment of one's everyday life. Bystanders, including non-drivers, can also be troubled by the "noise pollution" and loss of civility when vehicular horns are seemingly misused.

As can be seen, there is a need for a courtesy horn for an automotive vehicle, wherein the courtesy horn is configured to enable to the driver to send an alternate, gentler horn sound, and wherein the courtesy horn is provided in addition to the standard automotive vehicular horn.

The use of the courtesy horn conveys a more respectful message than the standard vehicle horn, more of a 'gentle nudge' than a 'harsh bark', thereby politely alerting another driver of, say, the fact that the light has now changed.

The courtesy horn may be operatively associated with a distinctive sound, whereby it is understood that such a horn sound is in fact a well-mannered notification as opposed to the standard vehicle horn. In certain embodiments, the courtesy horn provides a multi-tone electronic sound generator coupled with a speaker, wherein harmonic audio signals from the speaker may be of different predetermined tones and/or notes, wherein the audio signal may be produced in a predetermined order and for times characterizing a musical note sequence, such as that of chimes, a musical horn, or the like. In one embodiment, the audible signal of the courtesy horn may include two notes comprising a first non-aggressive high note followed by a second lower note, such as a C note followed by a B Natural note, thereby providing the hearer with the gentle, audio nudge.

SUMMARY OF THE INVENTION

In one aspect of the present invention, a method of improving audible signaling from a vehicle, the method including combining a courtesy vehicular horn to the vehicle with a first vehicular horn, wherein the courtesy vehicle horn is configured to emit at least a two-note audio signal, whereby the courtesy vehicular horn is directed to another vehicle when desired.

In another aspect of the present invention, the method of improving audible signaling from a vehicle includes wherein two notes of the at least two-note audio signal comprise a first high note followed by a second note lower than the first high note, wherein the first high note is a C note, and wherein the second note is a B Natural note, wherein a decibel level of the courtesy vehicular horn is less than a decibel level of the first vehicular horn, wherein the at least a two-notes are harmonics.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a courtesy horn for an automotive vehicle, wherein the courtesy horn is configured to enable to the driver to send an alternate, gentler horn sound, and wherein the courtesy horn is provided in addition to the standard automotive vehicular horn.

Figure 1:
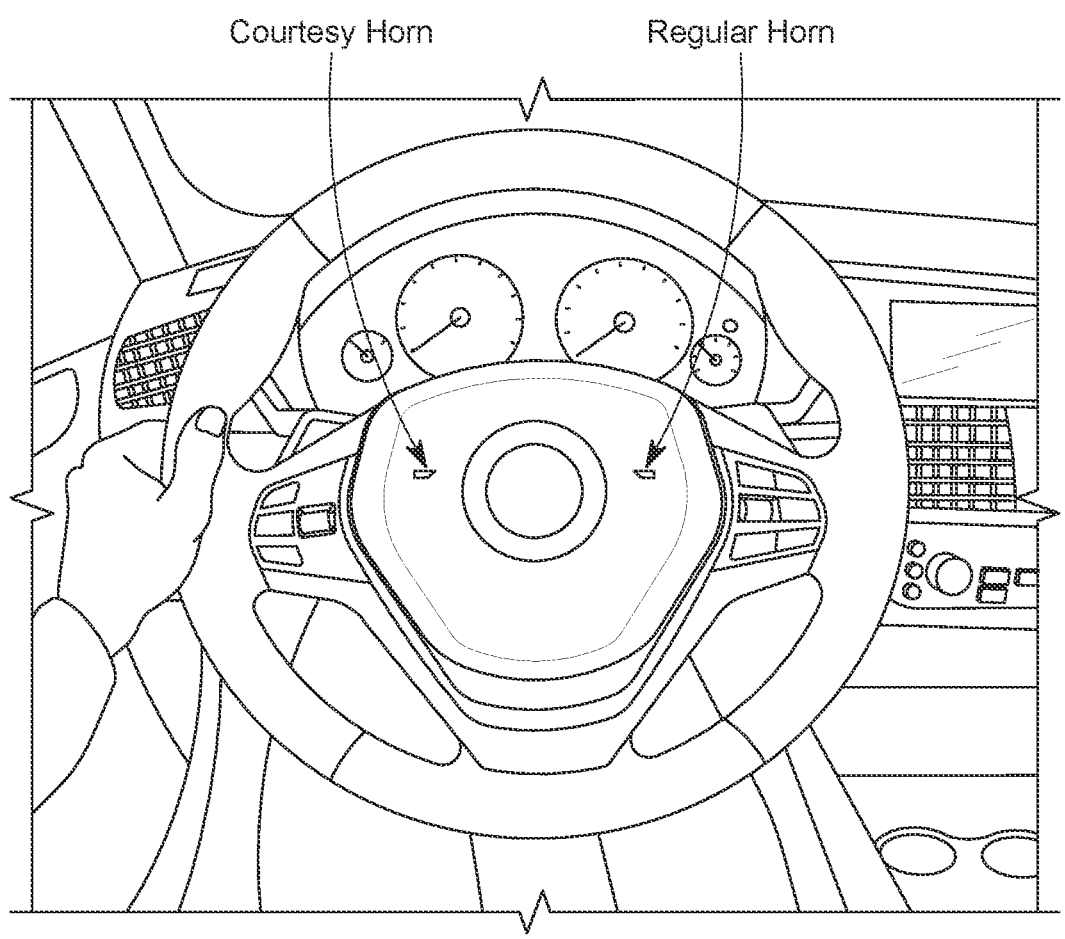
FIG. 1 is a perspective view of an exemplary embodiment of the present invention.
Figure 2:
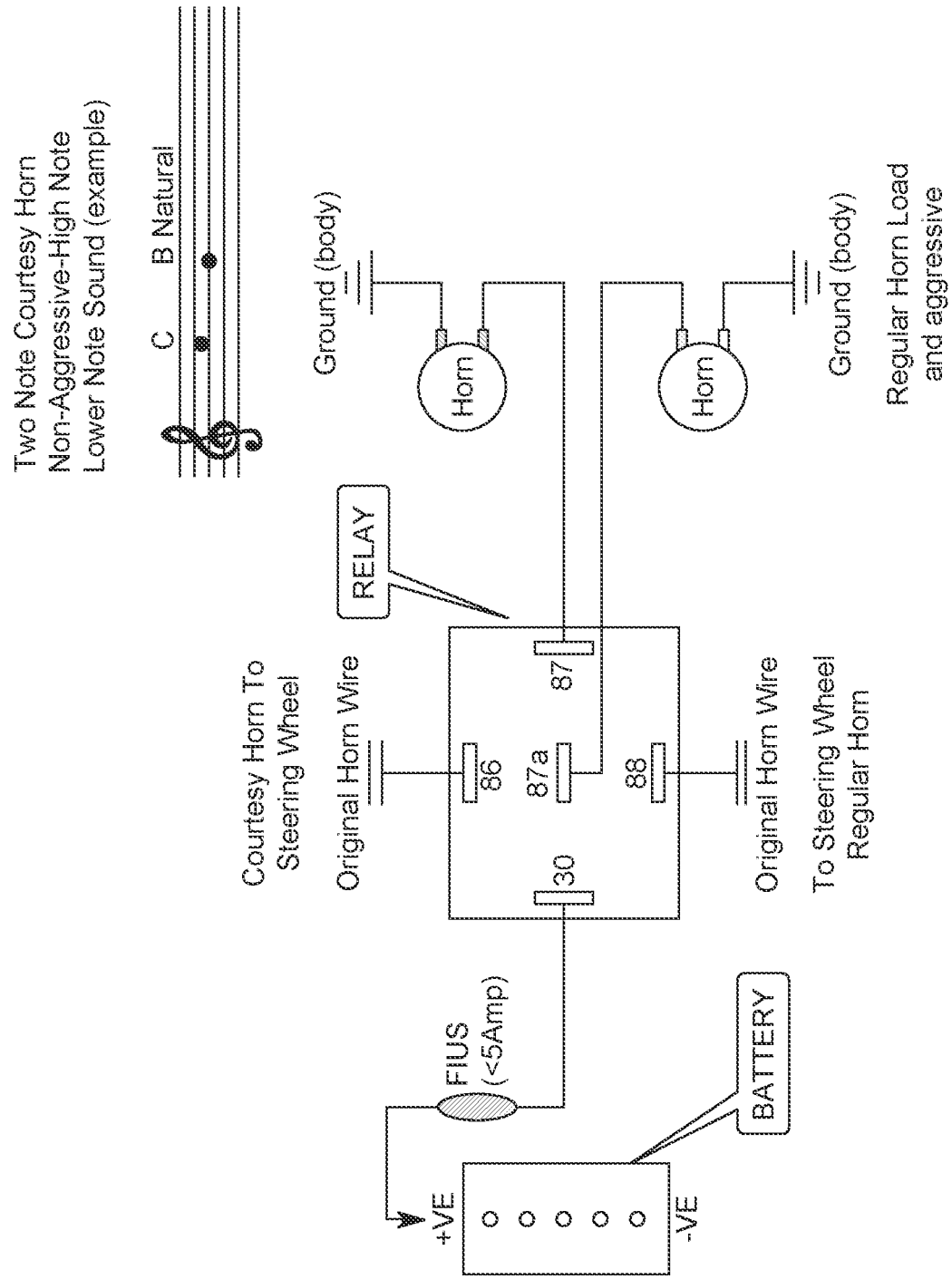
FIG. 2 is a schematic view of an exemplary embodiment of the present invention, showing a control circuitry.
Figure 3:
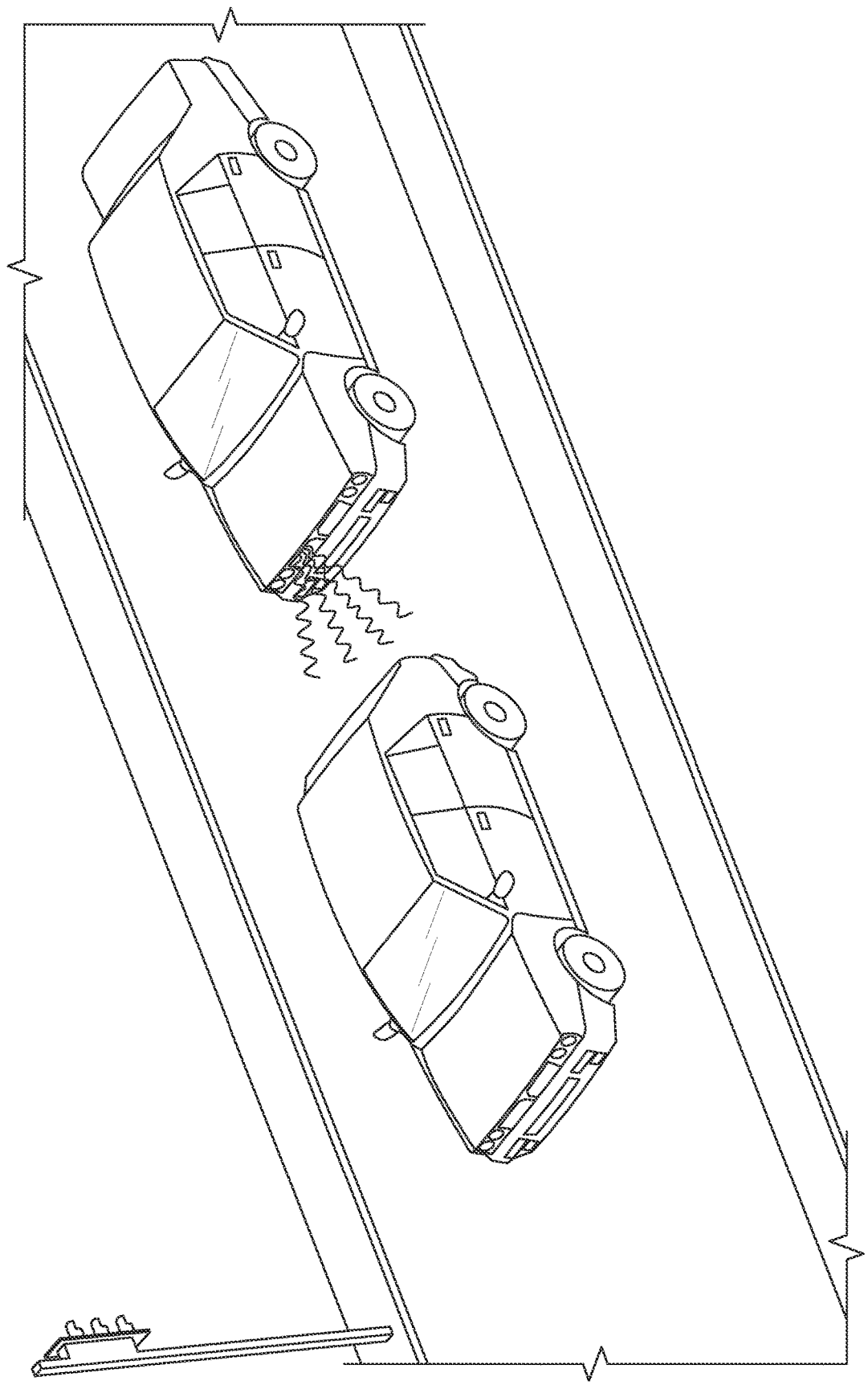
FIG. 3 is a top perspective view of an exemplary embodiment of the present invention, shown in use.

Referring now to FIGS. 1 through 3, the present invention may include a courtesy horn which can be added post manufacture or during initial assembly to an automotive vehicle so that the courtesy horn and the standard horn are available the driver of the associated vehicle. Accordingly, the driver can use the standard horn when the situation calls for it, or, when a gentle nudge would be more welcome, prudent, and effective, the driver can use the courtesy horn.

The courtesy horn may be operatively associated with a distinctive sound, whereby it is understood that such a horn sound is in fact a well-mannered notification as opposed to the standard vehicle horn. In certain embodiments, the courtesy horn provides a multi-tone electronic sound generator coupled with a speaker, wherein harmonic audio signals from the speaker may be of different predetermined tones and/or notes, wherein the audio signal may be produced in a predetermined order and for times characterizing a musical note sequence, such as that of chimes, a musical horn, or the like. In one embodiment, the audible signal of the courtesy horn may include two notes comprising a first non-aggressive high note followed by a second lower note, such as a C note followed by a B Natural note, thereby providing the hearer with a gentle, audio nudge.

In one embodiment, the courtesy horn may be disposed adjacent the standard horn, such as on the other side of the steering wheel, as illustrated in FIG. 1.

As used in this application, the term "about" or "approximately" refers to a range of values within plus or minus 10% of the specified number. And the term "substantially" refers to up to 90% or more of an entirety. Recitation of ranges of values herein are not intended to be limiting, referring instead individually to any and all values falling within the range, unless otherwise indicated, and each separate value within such a range is incorporated into the specification as if it were individually recited herein.

In the following description, it is understood that terms such as "first," "second," "top," "bottom," "up," "down,"

and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A method of improving audible signaling from a vehicle, the method comprising:
providing a courtesy vehicular horn to the vehicle with an emergency vehicular horn, the emergency horn configured to emit an emergency notification, wherein the courtesy vehicular horn and emergency vehicular horn are physically separated, wherein the courtesy vehicle horn is configured to emit at least a two-note audio signal comprising a first note and a second note that are emitted sequentially in time,
whereby the courtesy vehicular horn is directed forwardly, relative to said vehicle, to another vehicle when a non-emergency notification thereto is desired.

2. The method of claim 1, wherein the at least two-note audio signal comprises the first note followed in time by, wherein the second note, wherein the second note is lower than the first note.

3. The method of claim 2, wherein the first note is a C note, and wherein the second note is a B Natural note.

4. The method of claim 3, wherein a decibel level of the courtesy vehicular horn is less than a decibel level of the emergency vehicular horn.

5. The method of claim 4, wherein the at least a two-notes are harmonics.

6. The method of claim 5, further providing two triggers, one trigger for activating each of the courtesy vehicular horn and the emergency vehicular horn, respectively, wherein the two triggers are disposed along a steering wheel of the vehicle in a spaced apart arrangement.

7. The method of claim 6, wherein a single control circuitry operatively associates the two triggers to their respective vehicular horns.

8. A method of improving audible signaling from a vehicle, the method comprising:
providing a courtesy vehicular horn to the vehicle with an emergency vehicular horn, the emergency horn configured to emit an emergency notification, wherein the courtesy vehicular horn and emergency vehicular horn are physically separated, wherein the courtesy vehicle horn is configured to emit a two-note audio signal consisting essentially of a first note followed in time by a second note,
whereby the courtesy vehicular horn is directed forwardly, relative to said vehicle, to another vehicle when a non-emergency notification thereto is desired.

9. The method of claim 8, wherein the first note is a high note, and wherein the second note is lower than the first note.

10. The method of claim 9, wherein the first note is a C note, and wherein the second note is a B Natural note.

11. The method of claim 10, wherein a decibel level of the courtesy vehicular horn is less than a decibel level of the emergency vehicular horn.

12. The method of claim 11, wherein the first and second notes are harmonics relative to each other.

13. The method of claim 12, further providing two triggers, one trigger for activating each of the courtesy vehicular horn and the emergency vehicular horn, respectively, wherein the two triggers are disposed along a steering wheel of the vehicle in a spaced apart arrangement.

14. The method of claim 13, wherein a single control circuitry operatively associates the two triggers to their respective vehicular horns.

* * * * *